(12) United States Patent
Noltemeyer et al.

(10) Patent No.: US 11,754,445 B2
(45) Date of Patent: Sep. 12, 2023

(54) INTERFEROMETER ELEMENT, SPECTROMETER AND METHOD FOR OPERATING AN INTERFEROMETER

(71) Applicant: Robert Bosch GmbH, Stuttgart (DE)

(72) Inventors: Ralf Noltemeyer, Herrenberg (DE); Benedikt Stein, Stuttgart (DE); Christian Huber, Ludwigsburg (DE); Christoph Schelling, Stuttgart (DE); Christoph Daniel Kraemmer, Karlsruhe (DE); Reinhold Roedel, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 62 days.

(21) Appl. No.: 17/277,642

(22) PCT Filed: Oct. 22, 2019

(86) PCT No.: PCT/EP2019/078658
§ 371 (c)(1),
(2) Date: Mar. 18, 2021

(87) PCT Pub. No.: WO2020/083875
PCT Pub. Date: Apr. 30, 2020

(65) Prior Publication Data
US 2021/0356321 A1  Nov. 18, 2021

(30) Foreign Application Priority Data

Oct. 22, 2018  (DE) .................. 10 2018 217 996.4

(51) Int. Cl.
*G01J 3/02* (2006.01)
*G01J 3/26* (2006.01)
*G01J 3/453* (2006.01)

(52) U.S. Cl.
CPC ............. *G01J 3/027* (2013.01); *G01J 3/0229* (2013.01); *G01J 3/26* (2013.01); *G01J 3/4535* (2013.01)

(58) Field of Classification Search
CPC .. G01J 3/027; G01J 3/0229; G01J 3/26; G01J 3/4535
See application file for complete search history.

(56) References Cited

U.S. PATENT DOCUMENTS

| 4,525,067 A | 6/1985 | Hernandez |
| 6,424,466 B1 | 7/2002 | Flanders |

(Continued)

FOREIGN PATENT DOCUMENTS

WO  2018/043926 A1  3/2018

OTHER PUBLICATIONS

International Search Report corresponding to PCT Application No. PCT/EP2019/078658, dated Mar. 24, 2020 (German and English language document) (10 pages).

(Continued)

*Primary Examiner* — Tarifur R Chowdhury
*Assistant Examiner* — Mohamed Doumbia
(74) *Attorney, Agent, or Firm* — Maginot, Moore & Beck LLP

(57) ABSTRACT

The disclosure relates to an interferometer element for use in a spectrometer which includes a micromechanical Fabry-Perot filter element, which has at least a first mirror element, a second mirror element, and a third mirror element. Each of the first mirror element, the second mirror element, and the third mirror element are arranged in series in an optical path of the interferometer element, and at least one of a first distance between the first and second mirror elements, and a second distance between the second and third mirror elements is modifiable.

14 Claims, 9 Drawing Sheets

(56) References Cited

U.S. PATENT DOCUMENTS

| | | |
|---|---|---|
| 7,844,145 B1 | 11/2010 | Waters |
| 2004/0008438 A1* | 1/2004 | Sato .................. G02B 6/29358 |
| | | 359/890 |
| 2010/0097613 A1 | 4/2010 | Saari |
| 2013/0329232 A1 | 12/2013 | Antila et al. |
| 2014/0098371 A1* | 4/2014 | Sabry .................. G01J 3/0218 |
| | | 356/451 |
| 2014/0198388 A1 | 7/2014 | Reed et al. |
| 2014/0368825 A1 | 12/2014 | Rissanen et al. |

OTHER PUBLICATIONS

Jung, Boo Young et al., Control of resonant wavelength from organic light-emitting materials by use of a Fabry-Perot microcavity structure, Applied Optics, vol. 41, No. 16, Jun. 1, 2002, pp. 3312-3318.

* cited by examiner

US 11,754,445 B2

INTERFEROMETER ELEMENT, SPECTROMETER AND METHOD FOR OPERATING AN INTERFEROMETER

This application is a 35 U.S.C. § 371 National Stage Application of PCT/EP2019/078658, filed on Oct. 22, 2019, which claims the benefit of priority to Serial No. DE 10 2018 217 996.4, filed on Oct. 22, 2018 in Germany, the disclosures of which are incorporated herein by reference in their entirety.

BACKGROUND

The disclosure proceeds from an interferometer element, a spectrometer, and a method of the type of the disclosure. A computer program is also the subject matter of the present disclosure.

Conventional micromechanical Fabry-Perot interferometers (FPI) consist of two mirror elements, which are arranged on a substrate above an aperture. In addition, there are interferometers that are even constructed from two substrates with apertures. The light ray should be guided through the sandwich construction having two highly reflective mirrors, wherein in each case narrowband regions around a resonance wavelength and the harmonics thereof are transmitted in dependence on the distance between the two mirrors. By varying the distance, the desired resonance wavelength can be set, measured in a downstream detector, and in this way a spectrum can be serially recorded. An additional bandpass filter located upstream thereof can filter out the desired order, so that errors caused by other orders are minimized. In this way, the measurable wavelength range is limited to maximally the region between the desired order and the next-higher order. This wavelength range (free spectral range) is greater in the case of low orders, although the resolution in the wavelength domain is worse in this case. Owing to the static bandpass filter and the spectral separation of the harmonics, the wavelength measurement range of the FPI is greatly limited, meaning that the variety of application is greatly limited.

SUMMARY

Against this background, the approach introduced here introduces an interferometer element, an interferometer, a method, and finally a corresponding computer program in accordance with the disclosure. With the measures mentioned in the disclosure, advantageous developments and improvements of the apparatus specified in the disclosure are possible.

The approach introduced here provides an interferometer element for use in an interferometer, wherein the interferometer element has the following feature:

a micromechanical Fabry-Perot filter element, which has at least a first mirror element, a second mirror element, and a third mirror element, which are arranged in series in an optical path of the interferometer element and wherein a first distance between the first and second mirror elements and/or a second distance between the second and third mirror elements are modifiable.

A mirror element can be understood to mean an optical element that partially reflects light. The three mirror elements can here be arranged such that a distance between at least two of the mirror elements can be modified. An optical path can be understood to mean a course or a path along which the light travels through the interferometer element. In particular, the light can here pass through different optical components, such as for example the mirror elements, or can be reflected past these elements.

The approach proposed here is based on the finding that by using at least three mirror elements, two Fabry-Perot filters can be formed, which can be used specifically to enlarge the wavelength measurement range and the robustness of an evaluation of light from the optical path with respect to ambient light influences, in particular in connection with the use of non-modulatable light sources.

It is furthermore an advantage if, according to an embodiment of the approach introduced here, the interferometer element has at least a fourth mirror element, which is arranged in the optical path in series with respect to the first, second, and third mirror elements, and wherein a third distance between the third and fourth mirror elements is modifiable. Such an embodiment of the approach proposed here offers the advantage of providing, with four mirror elements, two mutually independent Fabry-Perot filters, for which a distance between two mirror elements of in each case one of the Fabry-Perot filters can be modified separately from and independently of the distance between the two mirror elements of the other Fabry-Perot filter. In this way, the transmission behavior of the interferometer element can be set with great flexibility.

An embodiment of the approach proposed here, in which a material of the first mirror element differs from a material of the second mirror element, and/or the material of the second mirror element differs from a material of the third mirror element, in particular in a manner such that the mirrors formed have different dispersions of the phase jump during the reflection, is advantageous. Such an embodiment of the approach proposed here makes a very large (spectral) measurement range of light traveling through the interferometer, in which for example light frequencies of specific orders are suppressed, possible.

According to a further embodiment of the approach proposed here, the material of the first, second, third, and/or a fourth mirror element is a metallic or metal-containing material. Alternatively or additionally, the materials of the first, second, third, and/or fourth mirror elements can differ in terms of their refractive indices. Such an embodiment of the approach proposed here offers the advantage of supporting a wavelength-dependent phase shift, such that a larger modification range of the first and/or second distance can be advantageously achieved.

According to another embodiment of the approach proposed here, an actuating unit for electrically controlling a modification of the first and/or second distance can also be provided. In particular, the actuating unit can here be embodied and configured to cyclically repeat a modification of the first and/or second distance. Such an embodiment of the approach proposed here offers the advantage that transmission of light through the entire optical path is made possible by a very simple setting of positions of the mirror elements and thus of the first and/or second distance a "shutter" operation is made possible, such that a light intensity in the case of the wavelengths to be measured can be modulated, even if a non-modulatable light source is used. In this way, signal correlation methods such as lock-in in the detection of the light are made possible, leading to an improvement of the signal-to-noise ratio.

An embodiment of the approach proposed here, in which the actuating unit is embodied and configured to modulate the first and/or second distance in a piezoelectric and/or magnetic manner, is particularly easy and cost-effective to implement technologically. Such an embodiment offers the advantage of being able to cover a greater measurement range with the same occurring frequency orders in the light and of thereby avoiding switching to other orders. Such switching would give rise to additional errors during the transmission of light through the Fabry-Perot interferometer (based on tolerances) and would necessitate an additional settling time being taken into consideration.

An embodiment of the approach proposed here, in which the actuating unit is embodied and configured to modify the first and/or second distance in response to a read distance signal, wherein the distance signal represents a current first and/or second distance, is furthermore expedient. In particular, the actuating unit can be embodied to set a maximum transmission of light through the interferometer element by way of the modification. In this way, it is possible to advantageously ensure that the first and/or second distance can be adjusted later in accordance with an optical detector signal, such that it is possible to detect light through the interferometer element with a high light intensity, from which a signal with sufficient and high signal quality can be obtained. An evaluation of this signal can once again be realized in a simple manner.

An embodiment of the approach proposed here, in which the actuating unit is embodied and configured to modify the first distance by a different distance value than the second distance using a common for modifying the first and second distances, is designed to be technologically very simple. In this way, a numerical and/or switching-technological outlay for outputting different control signals for modifying the first and/or second distance can be avoided.

Furthermore, an embodiment of the approach proposed here, in which spring tensions and/or spring elasticities of the first, second, and/or third mirror element of the Fabry-Perot filter element differ, is advantageous. Such an embodiment offers the advantage that such a spring tension and/or spring elasticity of the individual mirror elements can be implemented technologically very simply in a production process, such that controlling the modification of the distance in a manner that is likewise technologically very simple to realize can be implemented in a corresponding actuating unit.

An embodiment of the approach proposed here, in which the Fabry-Perot filter element is designed such that an object that is to be examined using the interferometer element is to be positioned between the first and second mirror element and/or between the second and third mirror element, is furthermore expedient. Such an embodiment offers the advantage of being able to split the Fabry-Perot filter element into multiple components, with the result that installation space available for arranging elements of an interferometer can be efficiently used.

According to another embodiment of the approach proposed here, a spectral filter element for attenuating and/or blocking transmission of light of a predetermined wavelength range through the interferometer element can also be provided. Such an embodiment offers the advantage of being able to efficiently block light with wavelength ranges that are desired and for the evaluation.

The advantages of the embodiments of the proposed approach introduced here can be also implemented in a spectrometer, which furthermore has a light source for providing the light beam through the interferometer element, and a detector for capturing evaluation light emerging from the spectrometer.

An embodiment of the approach proposed here, in which the detector has a plurality of detector elements that are embodied for light of different wavelength ranges and/or in which the light source is designed for the non-modulatable output of light, is particularly expedient. Such an embodiment offers the advantage of enlarging the light with respect to a wavelength measurement range that is capturable by the detector and also the use of a technologically very simple and thus cost-effectively designed light source for operating such an interferometer.

The approach introduced here furthermore provides a method for operating an embodiment of the interferometer introduced here, wherein the method has the following features:

modifying at least the first distance and/or the second distance to obtain output light; and detecting and/or analyzing output light emerging from the interferometer element.

In an optional step, light from the light source can advantageously also be output along the optical path through the interferometer element.

Using such an embodiment in the form of a method, it is also possible to efficiently and technologically simply implement the advantages described here.

This method can be implemented for example in the form of software or hardware or in a mixed form of software and hardware for example in a control device.

The approach introduced here furthermore provides a control device, which is embodied to perform, control, and realize the steps of a variant of a method introduced here in corresponding devices. The object on which the disclosure is based can also be achieved quickly and efficiently with this embodiment variant of the disclosure in the form of a control device.

The control device can for this purpose have at least one computation unit for processing signals or data, at least one storage unit for storing signals or data, at least one interface to a sensor or an actuator for reading sensor signals from the sensor or for outputting control signals to the actuator, and/or at least one communication interface for reading or outputting data embedded in a communication protocol. The computation unit can be, for example, a signal processor, a microcontroller, or the like, wherein the storage unit can be a flash memory, an EEPROM, or a magnetic storage unit. The communication interface can be embodied to read and output data in a wireless and/or wired manner, wherein a communication interface that can read or output data in a wired manner can read said data for example electrically or optically from a corresponding data transmission line or output it into a corresponding data transmission line.

A control device in the present case can be understood to mean an electrical device that processes sensor signals and outputs control and/or data signals in dependence thereon. The control device can have an interface, which can be embodied in the form of hardware and/or software.

If they are embodied in the form of hardware, the interfaces can be, for example, part of what is known as a system ASIC, which contains a wide variety of functions of the control device. However, it is also possible for the interfaces to be dedicated, integrated circuits or to at least partially consist of discrete structural components. If they are embodied in the form of software, the interfaces can be software modules that are present for example on a microcontroller, in addition to other software modules.

A computer program product or computer program with program code that can be stored on a machine-readable carrier or storage medium, such as a semiconductors memory, a hard disk memory, or an optical memory, and is used for performing, implementing, and/or controlling the steps of the method according to one of the previously described embodiments, in particular if the program product or program is executed on a computer or apparatus, is also advantageous.

BRIEF DESCRIPTION OF THE DRAWINGS

Exemplary embodiments of the approach introduced here are illustrated in the drawings and will be explained in more detail in the following description. In the figures.

DETAILED DESCRIPTION

In the description of expedient exemplary embodiments of the present disclosure that follows, identical or similar reference signs are used for the elements that are illustrated in the different figures and have similar effect, wherein a repeat description of said elements is dispensed with.

Figure 1:
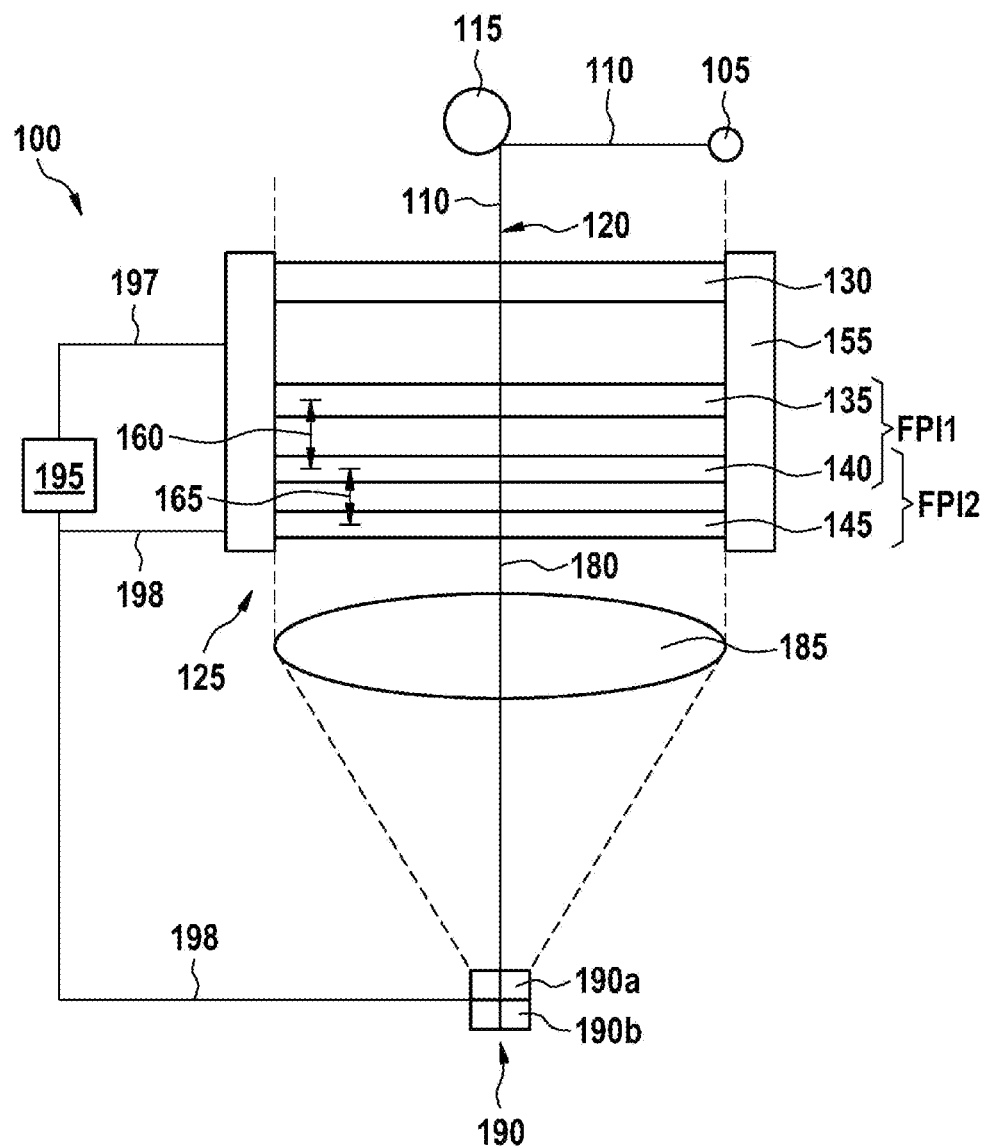
FIG. 1 shows a schematic view of an interferometer according to an exemplary embodiment of the present disclosure with three mirror elements.

FIG. 1 shows a schematic view of an interferometer 100 according to an exemplary embodiment of the present disclosure with three mirror elements. The spectrometer 100 comprises for example a light source 105, which is embodied for example in the form of light bulb, light-emitting diode, or laser diode for emitting light 110 of a predetermined wavelength or of a predetermined wavelength range in order to illuminate an object 115. The light 110 is reflected by the object 115 and guided along an optical path 120 through an interferometer element 125. Along said optical path 120, the light 110 initially passes through a spectral filter element 130, which is formed for example by a bandpass filter for attenuating and/or suppressing predetermined wavelength ranges of the light 110. Following this, the light 110 travels through a first mirror element 135, a second mirror element 140, and a third mirror element 145, which are arranged in series with respect to the optical path 120. The first mirror element 135, the second mirror element 140, and the third mirror element 145 are in this case coupled to one another via a (first) micromechanical actuator 155 to modify a first distance 160 between the first mirror element 135 and the second mirror element 140.

In addition, a second distance 165 between the second mirror element 140 and the third mirror element 145 can be modified by way of the first micromechanical actuator 155 and/or by way of a second micromechanical actuator, which is not illustrated in FIG. 1 for reasons of clarity. When the light 110 emerges from the interferometer element 125 along the optical path 120, it can be incident, as output light 180, through a beam-shaping element 185, such as a lens, on a detector unit 190. The detector unit 190 can here be designed for example as a detector array with first partial detectors 190a for measuring first wavelength ranges of the output light 180 and second partial detectors 190b for measuring second wavelength ranges of the output light 180. For example, the first partial detectors 190a can be implemented based on silicon, wherein the second partial detectors 190b were produced on the basis of an InGaAs material.

In order to be able to perform a modulation of the light 110 along the optical path 120 as efficiently as possible, an actuating unit 195 may be provided, which performs a variation of the first distance 160 and/or of the second distance 165 by correspondingly electrically controlling one or both micromechanical actuators 155, which can be understood, for example, as being part of the actuating unit 195, by means of a control signal 197. It is also possible here for a detector signal 198, for example, to be read by the actuating unit 190 in order to be able to capture hereby the actual current transmission behavior of the interferometer element 125 and to correspondingly be able to set the first distance 160 and/or the second distance 165 via the first micromechanical actuator 155 or the second micromechanical actuator, which is not illustrated. It is also conceivable that the detector signal contains information about a currently existing first distance 160 and/or second distance 165, with the result that even here it is possible to give feedback about the possibly necessary modification to the actuating unit 195 in order to realize a transmission behavior of the interferometer element 125 that is as optimum as possible.

Consequently, a basic structure of a Fabry-Perot interferometer (FPI) system is depicted in FIG. 1 as a spectrometer 100 with two series-connected FPIs. The resonator cavity (cavity) of a first Fabry-Perot interferometer FPI1 (as a first Fabry-Perot filter FPI1) is formed between the first mirror element 135 and the second mirror element 140. The resonator cavity (cavity) of a second Fabry-Perot interferometer (as a second Fabry-Perot filter FPI2) is formed between the second mirror element 140 and the third mirror element 145. The distances 160 and 165 of the two resonators must have a specific relationship to one another so as to obtain an overall transmission of the Fabry-Perot filter element 125 that is as favorable as possible. Depending on which wavelength order is operated in the respective cavity, the distances 160 and 165 should be set individually.

A lens connected downstream as an example of a beam-shaping element 185 focuses the light intensity of the output light 180 at the active detector surfaces of the detector 190. The limited extent of the detector 190 at the same time results in a limitation of the incidence angle interval from the Fabry-Perot interferometer, because the light rays 110 and 180 are no longer incident on the active region of the detector 190 on the margins. As a result, the spectral resolution of the interferometer element 125 is increased if non-collimated light is incident.

Integration of the construction of the Fabry-Perot filter element 125 in a micromechanical, more specifically micro-electromechanical, system (MEMS) is advantageous, so that the advantages in terms of installation size can be made use of and the individual mirror elements operate at the same temperature conditions. An additional high-pass or bandpass filter as a spectral filter element 130 can limit the measurement range, such that it is ensured that the orders of the overall transmission behavior that are not to be measured are suppressed.

Figure 2:
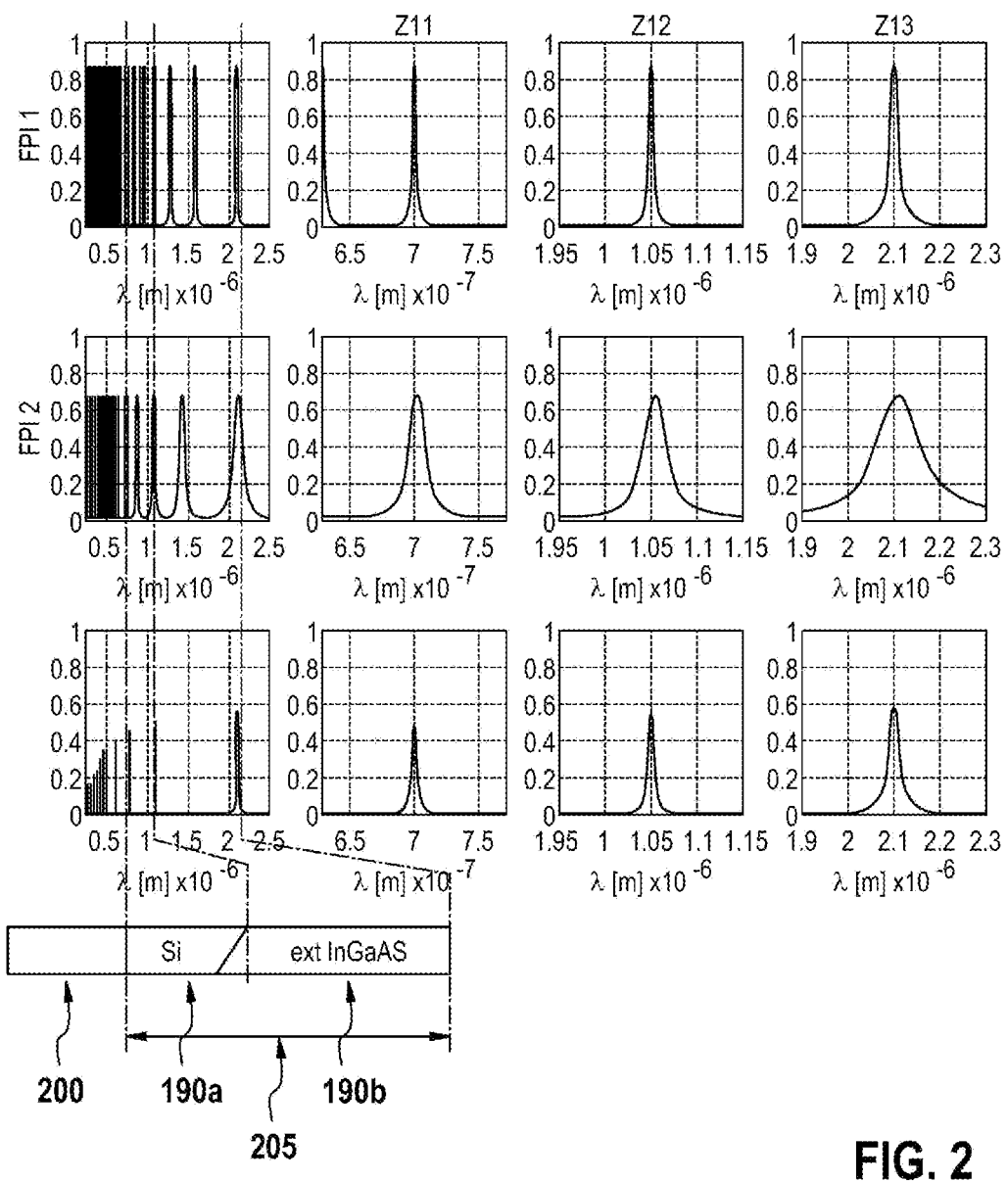
FIG. 2 shows diagrams illustrating a simulation result for an exemplary operation of the Fabry-Perot filter element.

FIG. 2 shows diagrams that illustrate a simulation result for an exemplary operation of the Fabry-Perot filter element 125 from FIG. 1 as a transfer function (here as a transmission behavior) between the normalized values 0 and 1 over the wavelength λ. In the left-hand diagram, each line shows an overview of the transmission behavior over a larger wavelength range Δ, wherein, in the three diagrams on the right, each line shows the respective transmission behavior in the region of one of the resonance frequencies. A first wavelength range 200 is here blocked by the spectral filter element 130, whereas the detector 190 is sensitive in a second wavelength range 205 and a partial detector 190a, for example on a silicon basis, is sensitive in a first partial spectral range, whereas the partial detector 190b, for example based on InGaAs, is sensitive in a second partial spectral range. FIG. 2 here shows the mode of operation of the FPI system as a Fabry-Perot filter element 125 at a defined wavelength of, for example, 2100 nm, wherein the cavity lengths, that is to say the distances 160 and 165 between the mirror elements, are operated with different wavelength orders, so that the undesirable resonator wavelengths of the first Fabry-Perot filter FPI1 and of the second Fabry-Perot filter FPI2 can be suppressed.

The upper line of the diagrams from FIG. 2 shows a transfer function of a first Fabry-Perot filter (FPI1), which comprises the first mirror element 135 and the second mirror element 140, whereas the middle line of the diagrams from FIG. 2 illustrates a transfer function of a second Fabry-Perot filter (FPI2), which comprises the second mirror element 140 and the third mirror element 145. The lower line of the diagrams from FIG. 2 illustrates a transfer function of the combination of the first and second Fabry-Perot filters. The first Fabry-Perot filter FPI1 is operated at a first resonance wavelength of 2100 nm in an advantageous wavelength order 3 to achieve a spectral full width at half maximum (FWHM) that is as small as possible. In the InGaAs detector measurement range of approximately 1050 . . . 2100 nm, the orders 4 and 5, which could result in an error signal, are integrated. In the Si detector measurement range of approximately 700 nm . . . 1050 nm, the orders 7 and 8 are likewise integrated. The abovementioned FPI1 orders 4, 5, 7, 8 etc. can be eliminated in the overall transmission with the aid of the second Fabry-Perot filter FPI2 if the second Fabry-Perot filter FPI2 is operated at 2100 nm for example in the order 2.

The orders 3, 6, 9 of the first Fabry-Perot filter FPI1 etc. would not be blocked, meaning that a measurement of the light intensities is possible. For every measurable order, only one detector 190 should evaluate the measurement signal.

Figure 3:
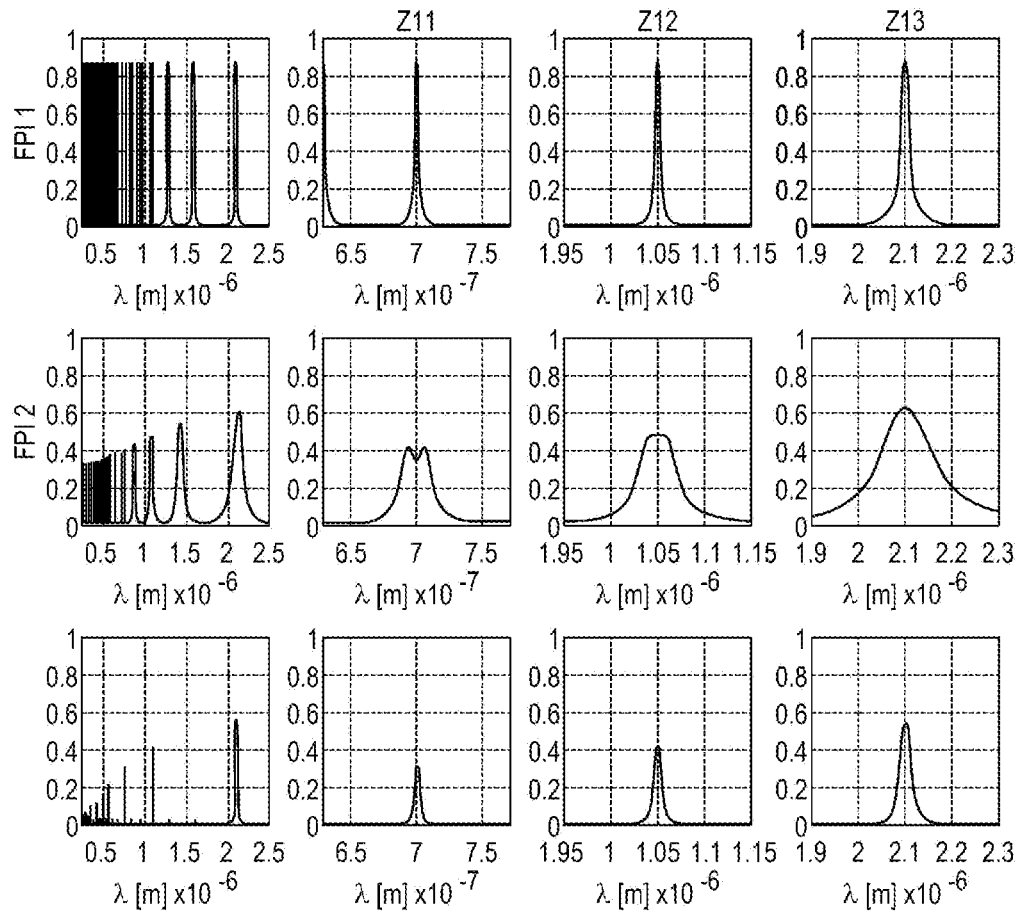
FIG. 3 show diagrams according to the illustration from FIG. 2, wherein in this case an exemplary embodiment in which the surface appearance of the third mirror element is provided with elevations/defects is shown.

FIG. 3 shows diagrams according to the illustration from FIG. 2, wherein in this case an embodiment is shown in which the surface appearance of the third mirror element 145 is provided with elevations/defects, for example with a height of approximately 20 nm, such that the overall system is highly error-tolerant with respect to relative position errors between the first Fabry-Perot filter FPI1 and the second Fabry-Perot filter FPI2.

FIGS. 2 and 3 furthermore show that, in the first Fabry-Perot filter FPI1, the order 3 in the (external) InGaAs detector or in the InGaAs detector can be seen in a reduced measurement range (zoom Z13 in FIGS. 2 and 3). FIGS. 2 and 3 furthermore show that, in the first Fabry-Perot filter FPI1, the order 6 can be seen in the Si detector (zoom Z12 in FIGS. 2 and 3). A high-pass filter at approximately 700 nm would block the higher wavelength orders (order 9 etc.).

By varying the mirror distances, the wavelength range of approximately 1050 nm to 2100 nm can be measured in this example with the FPI1 order 3, and at the same time the wavelength range of approximately 700 nm to 1050 nm can be measured with the FPI1 order 6. By using higher orders (3 and 6), the resolution is improved here.

In order to obtain a reproducible overall transmission, the light intensity errors (which can occur due to an inaccuracy in the positioning of the two resonator lengths relative to one another) should be minimized. Various technologies can be used herefor. FIG. 3 shows the effects of two such technologies that result in a widening of the FWHM (which can be seen for example in the third mirror element 145). A reduction in the reflectivity furthermore results in a widening of the FWHM and thus in a specific relative position insensitivity. A widening of the FWHM can also arise due to deviations of the surface appearance or surface roughness, for example, due to additional elevations, on the third mirror element 145. The different resonator lengths in the case of the second Fabry-Perot filter FPI2 should advantageously be implemented as position-independent rectangular distribution in order to reduce the requirements with respect to the positioning accuracy of FPI2.

Figure 4:
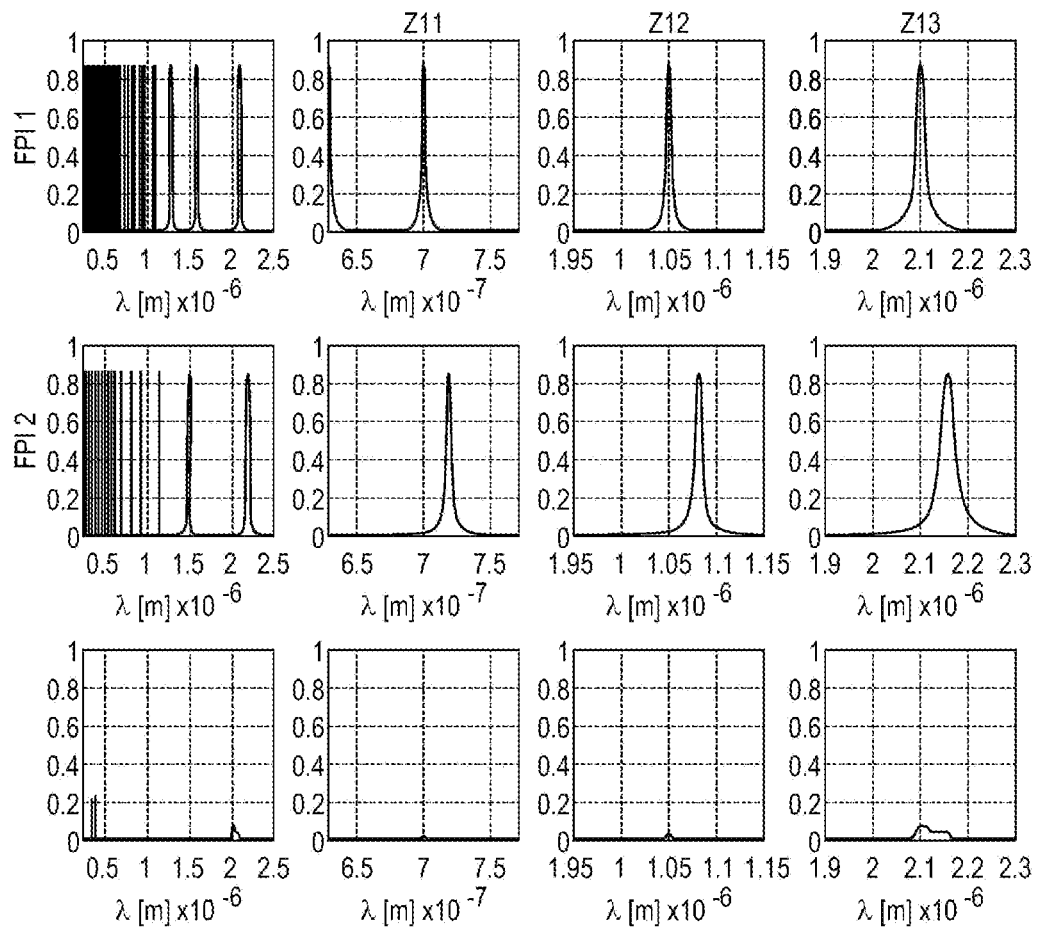
FIG. 4 shows diagrams according to the illustration from FIG. 2 or FIG. 3 according to a further exemplary embodiment for a simulation result of a further exemplary embodiment of the present disclosure.

FIG. 4 shows diagrams according to the illustration from FIG. 2 or FIG. 3. In this case, in the diagrams of FIG. 4, the effect of positioning the second Fabry-Perot filter FPI2 around approximately 60 nm has been simulated, wherein the resulting light intensity is significantly reduced. A modulation of the second distance 165 for example of ±60 nm will likewise result in an intensity modulation. This dependence could be used to establish position regulation based on the optical signal, with the result that a maximum transmission in dependence on the position or the first distance 160 in the first Fabry-Perot filter FPI1 is ensured. This position regulation could be incorporated in the actuating unit 195, for example according to FIG. 6.

Figure 5:
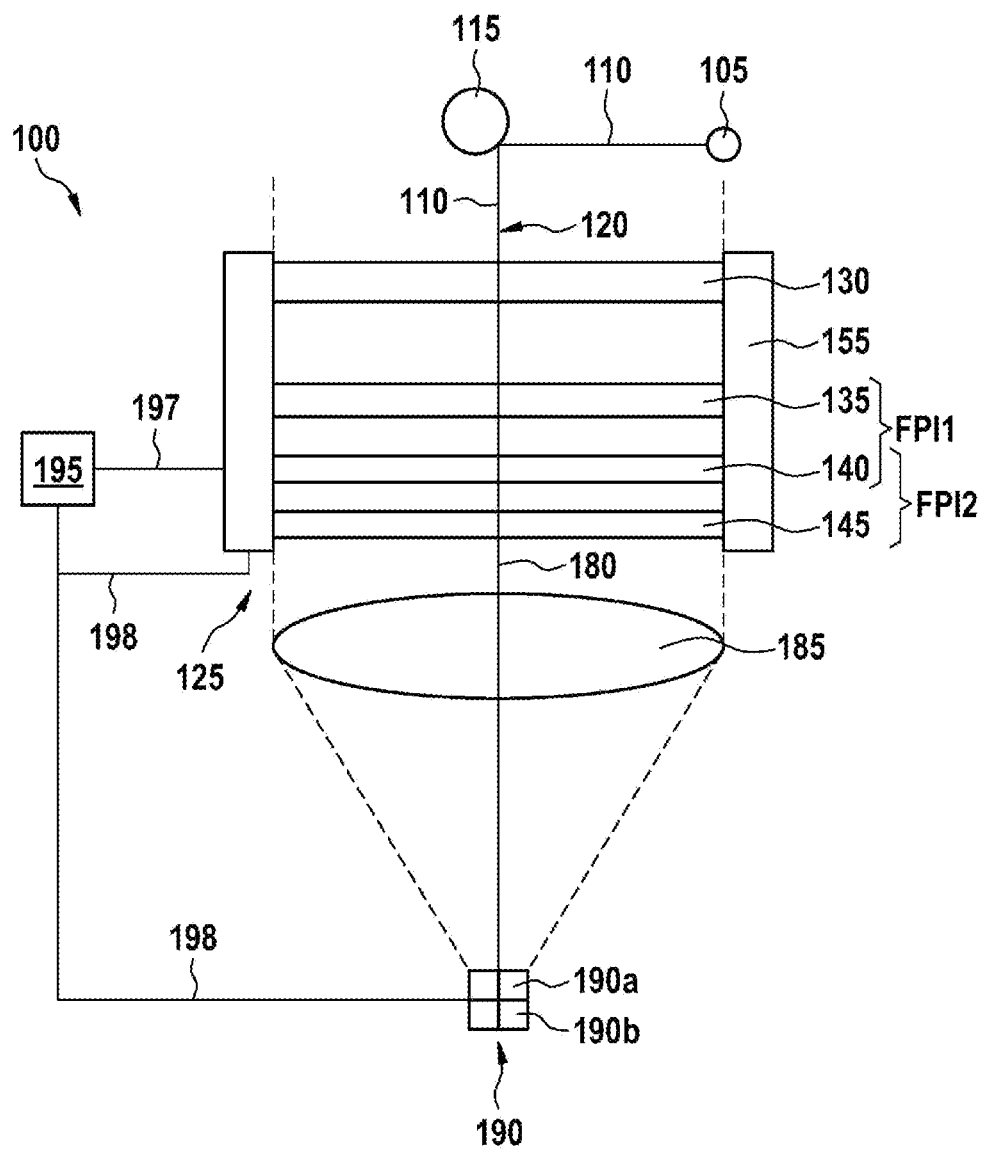
FIG. 5 shows a schematic illustration of an interferometer with a further exemplary embodiment of an interferometer element.

FIG. 5 shows a schematic illustration of an interferometer 100 with a further exemplary embodiment of an interferometer element 125. This exemplary embodiment illustrates a possibility for simplified control of the two Fabry-Perot filters FPI1 and FPI2 by the actuating unit 195. In this case, the actuators 155 of both Fabry-Perot filters FPI1 and FPI2 are supplied with the same or similar actuator voltage and/or actuator current. The corresponding stiffnesses or elasticities of the mirror elements and actuators, that is to say of the first mirror element 135, the second mirror element 140, and/or the third mirror element 145, should be interpreted such that the required positions is set by the voltage/the current applied together to the actuator 155 or the actuators 155 for modifying the first distance 160 and/or second distance 165. FIG. 5 thus shows an exemplary embodiment in which the spring constants of the respective mirror suspensions are adapted to one another such that the correct function or the operation of the interferometer element 125 is ensured only by applying a single control voltage.

Figure 6:
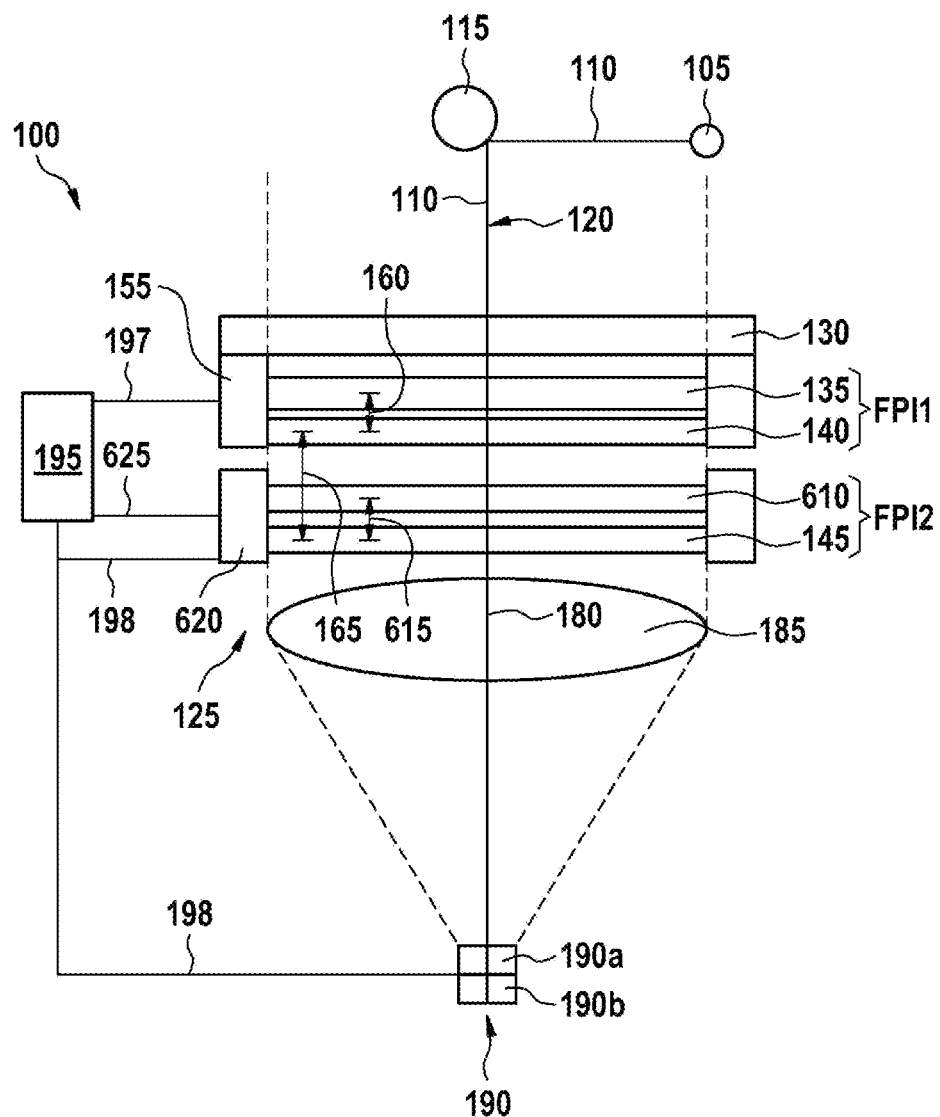
FIG. 6 shows a schematic illustration of an interferometer with a further exemplary embodiment of an interferometer element.

FIG. 6 shows a schematic illustration of an interferometer 100 with a further exemplary embodiment of an interferometer element 125. FIG. 6 describes an advantageous exemplary embodiment, that of a series connection of two separate Fabry-Perot filters FPI1 and FPI2, which are positioned relative to one another for example via a bonding method either directly or via a separate carrier. The first Fabry-Perot filter FPI1 here contains the first mirror element 135 and second mirror element 140, whereas the second Fabry-Perot filter FPI2 contains the third mirror element 145 and a fourth mirror element 610, which are arranged at a modifiable third distance 160 from one another. Essentially, decoupling of the second Fabry-Perot filter FPI2 from the second mirror element 140 has thus become possible. For example, the fourth mirror element 610 can be arranged in series in the optical path between the second mirror element 140 and the third mirror element 145. Modification of the second distance 165 and/or the third distance 615 is effected by means of a second micromechanical, specifically microelectromechanical (MEMS), actuator 620, which is controlled for example by means of a corresponding (further) control signal 625. The use of Fabry-Perot filters FPI1 and FPI2 that have the same construction and are operated with separate actuators 155 and 620 and with different orders and thus distances 160, 165 and 615, can result in a simplification of the manufacturing outlay for producing such an interferometer element 125. FIG. 6 thus shows an exemplary embodiment, in which two actuators 155 and 620, which are designed as MEMS structural components and can modify in each case the distance 160 and 615 between two mirror elements, are used.

Figure 7:
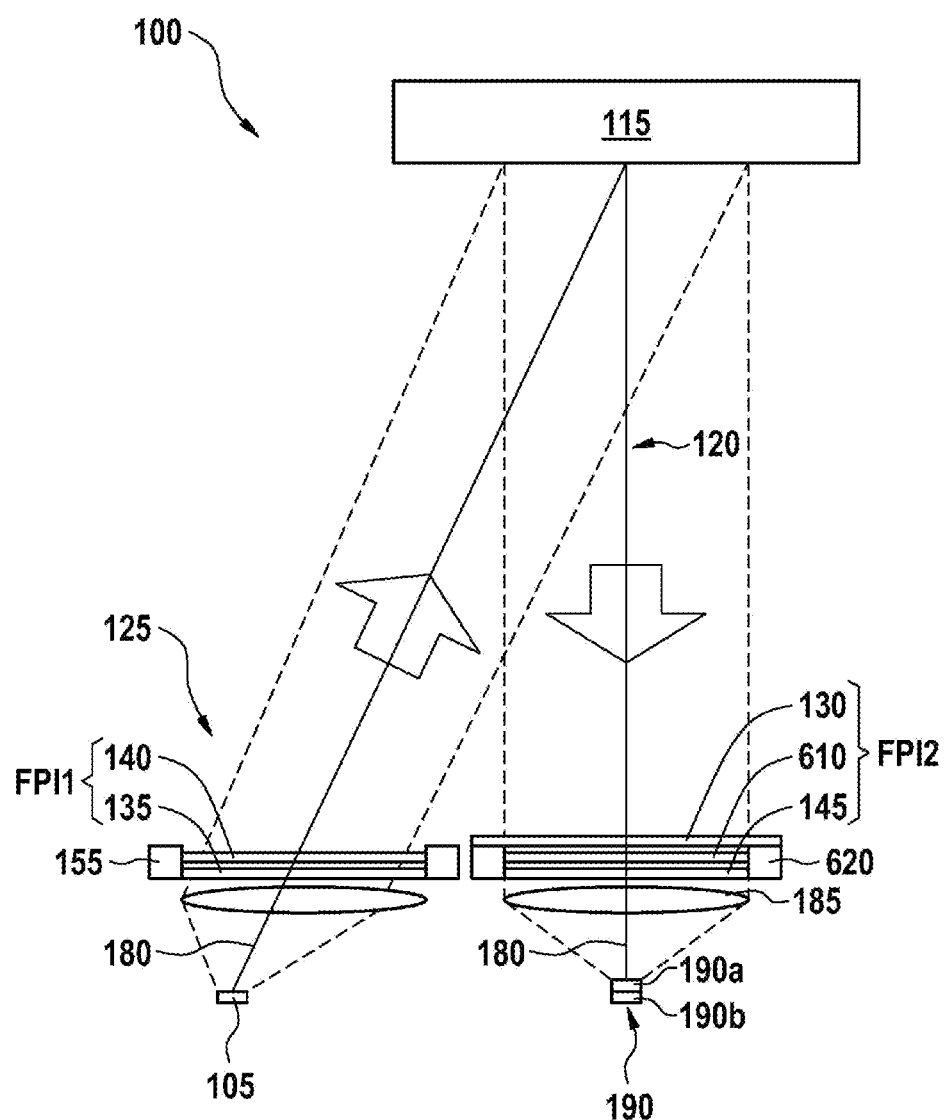
FIG. 7 shows a schematic illustration of an interferometer with a further exemplary embodiment of an interferometer element.

FIG. 7 shows a schematic illustration of an interferometer 100 with a further exemplary embodiment of an interferometer element 125. In this interferometer element 125, the two Fabry-Perot filters FPI1 and FPI2 are split differently in the optical path 120. The object 115 (as the target) is here arranged in the optical path 120 between the second mirror element 140 and the third mirror element 145 or fourth mirror element 610. FIG. 7 thus shows an exemplary embodiment in which a Fabry-Perot filter FPI1 (the mirror separation of which is modified by a first micromechanical actuator 155) is positioned in front of the light source 105 and a second Fabry-Perot filter FPI2 (the mirror separation of which is modified by a second micromechanical actuator 620) is positioned in front of the detector 190.

Figure 8:
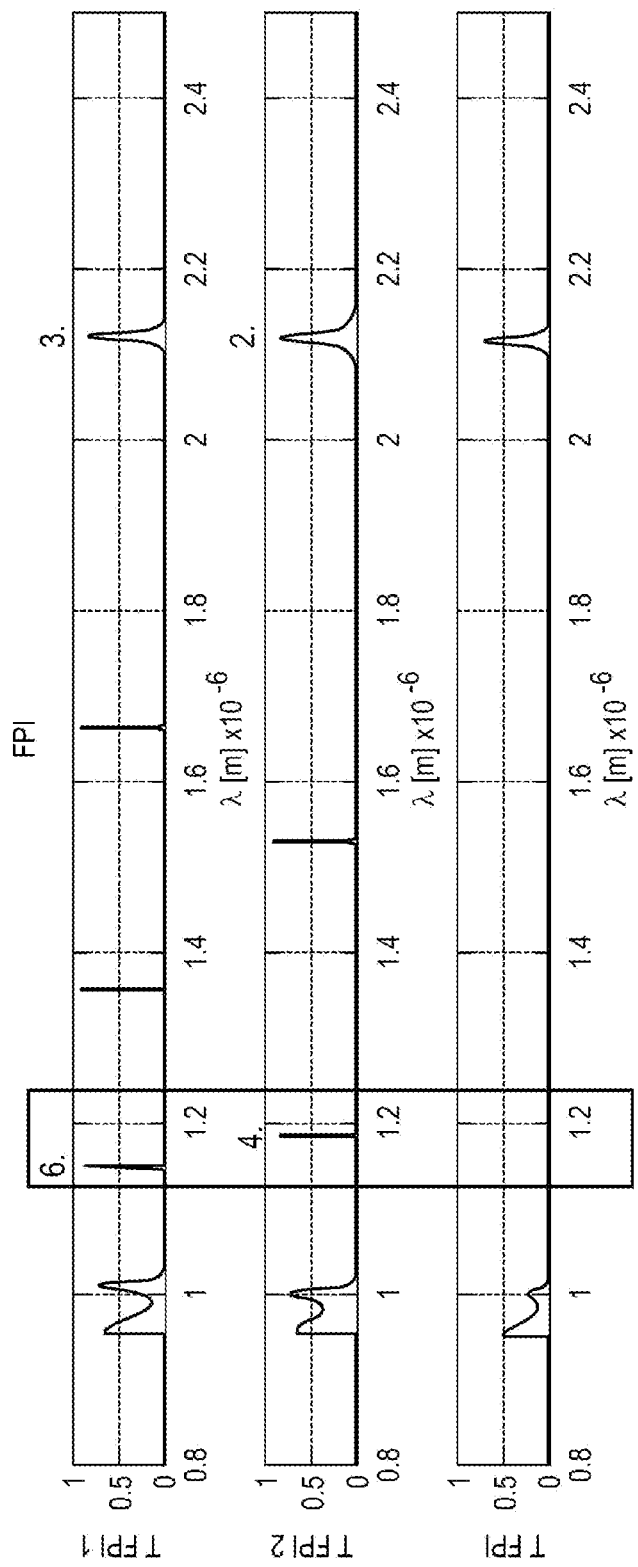
FIG. 8 shows diagrams according to the illustration from FIG. 2 or FIG. 3 for a simulation result of a further exemplary embodiment of the present disclosure.

FIG. 8 shows diagrams corresponding to the illustration from FIG. 2 or FIG. 3, in which in this case only a spectral behavior of two FPIs connected in series with phase shift dispersion are illustrated. In the region of the rectangle with order 6 (FPI1) and order 4 (FPI2), a resonance wavelength was expected (according to the illustration in FIG. 2). Due to the phase shift dispersion, the orders used experience a different nonlinearity with respect to the behavior between gap distance and wavelength, such that these resonance wavelengths are also blocked, resulting in a larger spectral measurement range/detector. In comparison to this advantage, FIG. 2 illustrates a linear dependence between gap distance and wavelength, which means that the orders 3/6/ . . . (FPI1) and orders 2/4/ . . . (FPI2) can pass through the FPI combination. FIG. 8 thus shows in diagrams an exemplary embodiment, in which the phase shift dispersion can result in an enlargement of the measurement range in the case of different orders and thus gap distances. In the region of the rectangle with order 6 (FPI1) and order 4 (FPI2), a resonance wavelength was expected that can pass, comparably to order 3 (FPI1) and order 2 (FPI2), through the FPI combination (smaller FWHM).

Figure 9:
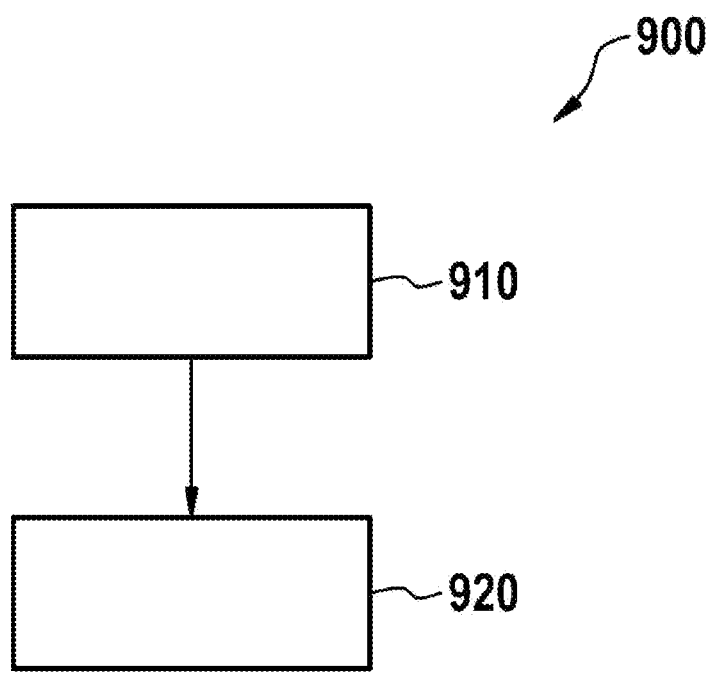
FIG. 9 shows a flowchart of a method according to an exemplary embodiment.

FIG. 9 shows a flowchart of a method 900 for operating a variant of an interferometer 100 introduced here, wherein the method 900 includes a step 910 of modifying at least the first distance and/or the second distance in order to obtain output light. Finally, the method 900 comprises a step 920 of detecting and/or analyzing output light emerging from the interferometer element.

In summary, it should be noted that in exemplary embodiments of the approach introduced here, an actuator 155 of the first Fabry-Perot filter FPI1 is positioned directly in front of the light source 105 (for example as an emitter-lens combination) and can temporally modulate the spectral behavior of the light source 105 by the first distance 160 being modified temporally. Alternatively or additionally, a second actuator 620 of the second Fabry-Perot filter FPI2 can be positioned together for example with a high-pass or bandpass filter as a spectral filter element 130 in front of the detector 190/the detectors 190a, 190b. In this exemplary embodiment, the distance 160 of the relevant FPI (different order with respect to actuator 155 of the first Fabry-Perot filter FPI1) is statically maintained.

The temporal modulation of the light intensity of the light source 105 of a wavelength can result in improved suppression of the ambient light and the subsequent electronics or an evaluation unit (which is embodied for example as part of the actuating unit 195), if the detector signals are filtered according to the modulation frequency and evaluated. FIG. 3 (maximum) and FIG. 4 (minimum) show examples of the spectral intensity values thus obtained.

By enlarging the measurement range, an exemplary embodiment that can set a larger gap distance variation is advantageous. This is advantageously possible for example with an electrostatic and/or magnetic and/or piezoelectric drive as the actuator 155 or 620 and with, for example, detection of the gap distance (capacitive, piezoresistive).

An objective of the approach introduced here can specifically be considered that of achieving an enlargement of the wavelength measurement range and the robustness with respect to ambient light influences for non-modulatable light sources. An enlargement of the wavelength measurement range can also be obtained by suppression of undesirable wavelength orders of an FPI cavern in the complete optical path with simultaneously low spectral full width at half maximum and high resolution. Additionally or alternatively, parallel-mounted or serially mounted detectors can be used, the spectral sensitivity and transmittance of which permit enlargement of the wavelength measurement range. An increase in the robustness with respect to ambient light influences of exemplary embodiments of an interferometer element introduced here is achieved by modulation of the transmission of the FPI optical path, for example in "shutter" operation.

In order to be able to achieve such advantages, embodiments of the approach introduced here can comprise an interferometer element as a structural component, which can be used in a miniature spectrometer and have a light source, a spectral element, and a photodetector. An exemplary embodiment, in which the spectral element is constructed from micromechanical Fabry-Perot interferometer structural components with greater than/equal to three mirror elements which are arranged one on top of one another, which are positioned by adjustable at least two distances, is furthermore expedient. Furthermore, the photodetector can also consist of differently spectrally sensitive individual detectors (possibly with filter(s) connected upstream), which are suitably positioned and, in sum, permit an enlargement of the wavelength measurement range. In a further exemplary embodiment, the transmission of the entire optical path can also be influenced by setting the two mirror positions in a "shutter" operation, such that the light intensity in the case of the wavelengths to be measured can be modulated. An exemplary embodiment of the approach introduced here with a filter element connected upstream for limiting the entire measurement range so as to exclude undesired wavelength ranges is furthermore advantageous. It is also possible in an exemplary embodiment for the necessary mirror distances to be measured and for the actuator unit to control or regulate the required mirror distances and for evaluation of the detector signals to be made possible. According to another exemplary embodiment, only for example the first mirror distance according to the desired wavelength may be measured and the further mirror distances are adjusted later according to the optical detector signal, such that a maximum transmission is ensured at every time period. An exemplary embodiment, in which the mirror elements are driven piezoelectrically or magnetically such that a larger gap adjustment range, that is to say a modification range of the first and/or second distance, in contrast to an electrostatic drive, can be used, is furthermore advantageous. Consequently, a larger measurement range with the same orders can be covered, and switching to other orders (for example from order 2/3 to the orders 2/5 or 5/3) can be avoided. Switching would cause additional errors in the transmission of the FPI (based on tolerances) and an additional settling time must be taken into consideration. In a further exemplary embodiment, the selection of the material of the mirror elements can be such that, owing to a wavelength-dependent phase shift (dispersion), a very large measurement range comes about, wherein for example further orders are suppressed. By a broadband selection of the mirror materials (metal or BRAGG structure), the wavelength-dependent phase shift is supported, such that a larger gap adjustment range is advantageous. An exemplary embodiment of the approach introduced here with an FPI design such that the necessary position can be attained by both mirror distances with only one control voltage (for example by a different design of the spring geometries of the respective FPI mirror elements when the FPI cavities or distances are operated with different orders) is particularly easily technologically realizable. Overall, an advantage of one or more exemplary embodiments that can be mentioned is that an enlargement of the spectral measurement range as compared to a standard FPI becomes possible. An enlargement of the spectral measurement range can also be achieved due to wavelength-dependent phase shift. Alternatively or additionally, a better spectral full width at half maximum can be achieved, because higher orders can be used, at which the measurable wavelength range for a conventional construction would be very small. Parallel measurement of different spectral ranges (when using different detectors) also results in a decreased measurement time. Finally, it is furthermore possible by modulating the light intensity to use non-modulatable light sources with simultaneous better noise suppression of the ambient light and the downstream electronics.

If an exemplary embodiment comprises an "and/or" connection between a first feature and a second feature, this should be read to mean that the exemplary embodiment, according to one embodiment, has both the first feature and the second feature and, according to a further embodiment, has either only the first feature or only the second feature.

The invention claimed is:

1. An interferometer element for use in a spectrometer, comprising:
    a micromechanical Fabry-Perot filter element, which has at least a first mirror element, a second mirror element, and a third mirror element, wherein
    each of the first mirror element, the second mirror element, and the third mirror element are arranged in series in an optical path of the interferometer element,
    at least one of a first distance between the first and second mirror elements, and a second distance between the second and third mirror elements is modifiable,
    the first, second, and third mirror elements are supported by respective suspensions, and
    each of spring tensions or spring elasticities of the respective suspensions of the first, second, and third mirror element of the micromechanical Fabry-Perot filter element differ from each of the spring tensions or spring elasticities of the other of the respective suspensions of the first, second, and third mirror element.

2. The interferometer element as claimed in claim 1, in which at least one of a first material of the first mirror element differs from a second material of the second mirror element such that the first mirror element and the second mirror element have different dispersions of a phase jump during a first reflection, and the second material of the second mirror element differs from a third material of the third mirror element, such that the second mirror element and the third mirror element have different dispersions of a phase jump during a second reflection.

3. The interferometer element as claimed in claim 2, in which at least one of the first, second, and third material is a metallic or metal-containing material, and differs with respect to the refractive index from the other of the first, second, and third material.

4. The interferometer element as claimed in claim 1, further comprising:
    a control unit configured to electrically control modification of the at least one of the first and second distance, wherein the control unit is configured to cyclically repeat the modification of the at least one of the first and second distance.

5. The interferometer element as claimed in claim 4, in which the control unit is configured to modify the at least one of the first and second distance at least one of electrostatically, piezoelectrically, and magnetically.

6. The interferometer element as claimed in claim 4, in which the control unit is configured to modify the at least one of the first and second distance in response to a read distance signal, wherein at least one of the read distance signal represents at least one of a current first and a second distance, and the control unit is configured to set a maximum transmission of light through the micromechanical Fabry-Perot filter element by way of the modification.

7. The interferometer element as claimed in claim 1, in which the micromechanical Fabry-Perot filter element is designed such that an object that is examined using the interferometer element is positioned between at least one of the first and second mirror element, and between the second and third mirror element.

8. The interferometer element as claimed in claim 1, further comprising:
    a spectral filter element configured to at least one of attenuate, and block a transmission of light of a predetermined wavelength range through the interferometer element.

9. The interferometer element as claimed in claim 1, further comprising:
    at least a fourth mirror element, which is arranged in the optical path in series with respect to the first, second, and third mirror elements, and wherein a third distance between the third and fourth mirror elements is modifiable.

10. A spectrometer comprising:
    an interferometer element including
        a micromechanical Fabry-Perot filter element, which has at least a first mirror element, a second mirror element, and a third mirror element, wherein each of the first mirror element, the second mirror element, and the third mirror element are arranged in series in an optical path of the interferometer element, at least one of a first distance between the first and second mirror elements, and a second distance between the second and third mirror elements is modifiable, the first, second, and third mirror elements are supported by respective suspensions, and each of spring tensions or spring elasticities of the respective suspensions of the first, second, and third mirror element of the micromechanical Fabry-Perot filter element differ from each of the spring tensions or spring elasticities of the other of the respective suspensions of the first, second, and third mirror element;

a light source configured to provide a light beam through the interferometer element; and a detector configured to capture output light emerging from the spectrometer.

11. The spectrometer as claimed in claim 10, in which the detector has a plurality of detector elements are at least one of configured for light of different wavelength ranges, and in which the light source is designed for the non-modulatable output of light.

12. A method for operating an interferometer comprising: providing an interferometer element including a micromechanical Fabry-Perot filter element, which has at least a first mirror element, a second mirror element, and a third mirror element, wherein each of the first mirror element, the second mirror element, and the third mirror element are arranged in series in an optical path of the interferometer element, and at least one of a first distance between the first and second mirror elements, and a second distance between the second and third mirror elements is modifiable, the first, second, and third mirror elements are supported by respective suspensions, and each of spring tensions or spring elasticities of the respective suspensions of the first, second, and third mirror element of the micromechanical Fabry-Perot filter element differ from each of the spring tensions or spring elasticities of the other of the respective suspensions of the first, second, and third mirror element;

modifying at least one of the first distance and the second distance to obtain output light; and at least one of detecting, and analyzing output light emerging from the interferometer element.

13. The method as claimed in claim 12, wherein modifying the at least one of the first distance and the second distance and the at least one of detecting and analyzing the output light is controlled by executing a computer program.

14. The method as claimed in claim 13, wherein the computer program is stored on a machine readable storage medium.

* * * * *